Dec. 31, 1935.   R. E. WILSON   2,026,336
REMOVAL OF WAX FROM OIL
Filed June 20, 1932
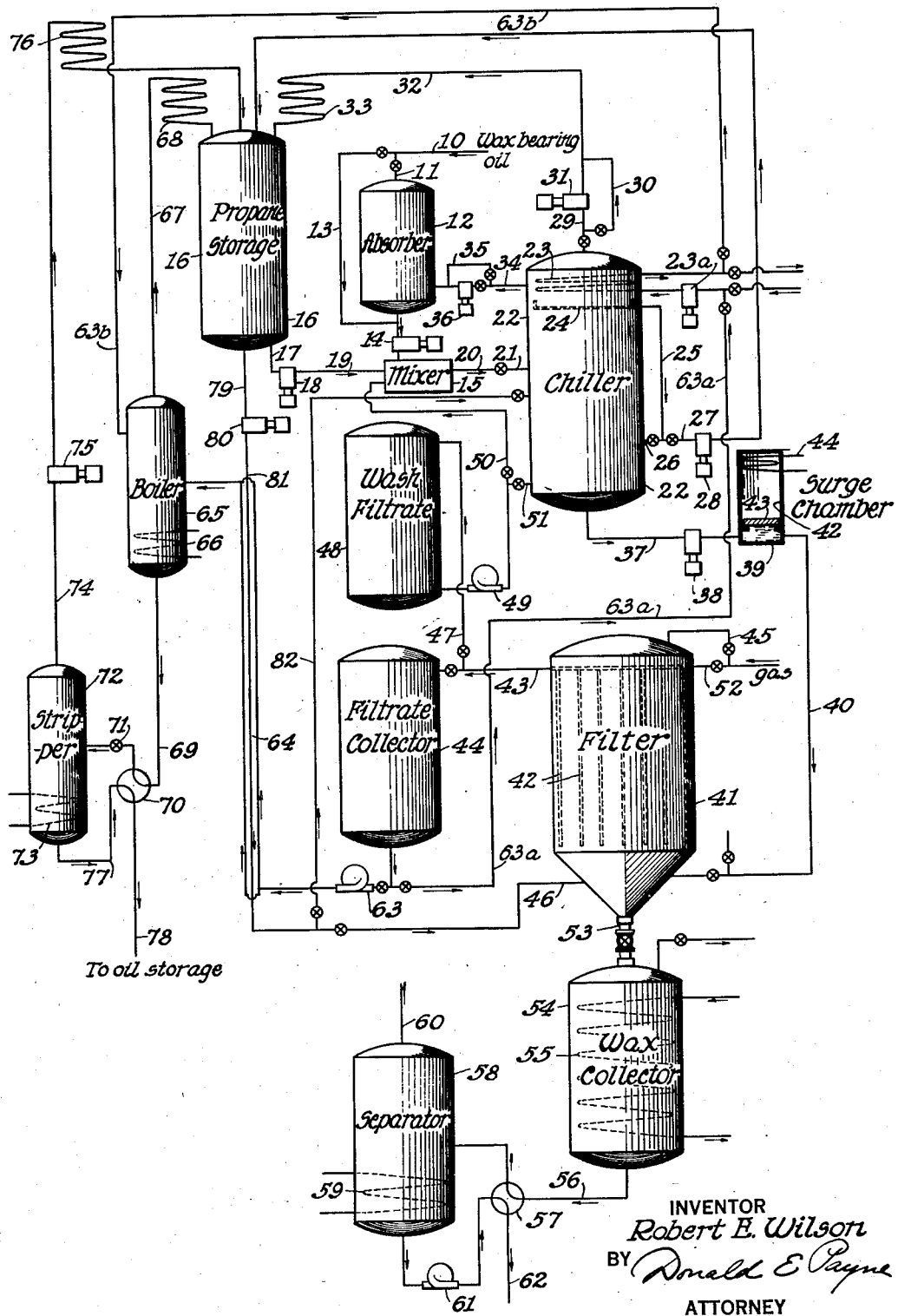
INVENTOR
Robert E. Wilson
BY Donald E. Payne
ATTORNEY Patented Dec. 31, 1935

2,026,336

UNITED STATES PATENT OFFICE 2,026,336

REMOVAL OF WAX FROM OIL

Robert E. Wilson, Chicago, Ill., assignor to Standard Oil Company, Chicago, Ill., a corporation of Indiana Application June 20, 1932, Serial No. 618,092

13 Claims. (Cl. 196—18)

This invention relates to the dewaxing of oils with a light and/or normally gaseous diluent, such as propane.

Mineral oils frequently contain wax, and unless this wax is removed the oil will not flow at low temperatures,—it will not have a low "pour point". It has been the custom to separate this wax from the oil by diluting the waxy oil with naphtha, chilling with brine coils at the rate of a few degrees per hour, and finally filtering, settling or centrifuging the wax from the diluted oil. The wax chillers were cumbersome, the wax often did not crystallize in readily filterable form, and scrapers were necessary to remove the wax from the cold metal surfaces of the coolers. By using propane instead of naphtha as a diluent, the cooling may be effected by vaporizing a part of the diluent, thereby avoiding the use of cooling coils. The propane "self refrigeration" system, however, may require high compressor costs, and the diluent ratio often becomes uncertain. The object of my invention is to avoid these difficulties and to provide an improved "propane dewaxing" system.

In other words, the object of my invention is to provide an improved method and means for chilling a diluted oil-wax mixture by direct refrigeration, to avoid the use of scrapers in the chilling apparatus, and to produce wax crystals which are readily filterable. A further object is to maintain a constant oil-diluent ratio in the chill chamber wherein wax is crystallized by reduction in temperature caused by the vaporization of the diluent. A further object is to save compressor costs and to utilize more effectively the refrigeration effect of cold wax slurry and cold filtrate.

A further object is to provide improved means for maintaining a constant, non-pulsating pressure on the filter so that the filter cloth will not become clogged and the filter cake will not be disrupted. A further object is to provide an improved gas-cushioned surge chamber for use in systems wherein liquids are transferred at temperatures near their boiling points, the gas in the chamber being furnished by the vaporization of a portion of the liquid.

In practicing my invention I arrange cooling coils in the vapor space of a chill chamber. Condensation of vapors lowers the pressure in the chiller and causes more rapid vaporization or boiling, which in turn refrigerates the mixture by abstracting therefrom the necessary heat of vaporization. The condensed vapors may be trapped out but I prefer to return them to the mixture which is undergoing chilling; this helps to maintain a constant diluent-oil ratio and at the same time it hastens the cooling because the condensed diluent is at a considerably lower temperature than that of the oil-wax mixture. Wax is crystallized by direct refrigeration in a readily filterable form, and there is no tendency for it to adhere to metal walls.

Other features of the invention may be mentioned, particularly the direct condensation of propane in the early stages of cooling, thereby avoiding the use of compressors, the surge chamber for maintaining a uniform pressure on the filter, the heat exchange system for taking advantage of cold liquids to save in the cost of refrigeration, etc. Other features will be apparent as the detailed disclosure of the invention proceeds.

The accompanying drawing which forms a part of this specification represents diagrammatically a layout or flow sheet of my improved dewaxing system.

In describing my invention I will refer to the dewaxing of an overhead Mid-Continent lubricating oil which has been acid treated and which has a viscosity of about 82 sec. Saybolt at 210° F. It should be understood, however, that the invention is equally applicable to any wax-bearing mineral oil, whether it is an overhead or a residual stock, light or heavy, treated or untreated. The invention is applicable to any oil which contains wax.

In practicing my invention I prefer to use liquefied light hydrocarbon diluents, such as propane, isobutane, ethane, normal butane, ethylene, propylene, etc. or mixtures thereof. I do not limit myself however, to such diluents and I may use normally gaseous ethers, such as dimethyl ether, methylethyl ether, or ethylene oxide, normally gaseous halogenated compounds such as chloroform, methylene chloride, dichlor difluor methane, normally gaseous amines, etc. If cooling is accomplished under reduced pressure I may use other light volatile diluents, such as pentane and hexane, ethyl ether, ethylene chloride, benzene, acetone, ethyl formate, methyl acetate, etc.

The wax-bearing oil is introduced from a suitable storage tank through pipe 10, either through pipe 11 and absorber 12, or through by-pass 13 to pump 14 and mixer 15 where it is mixed with diluent from storage tank 16, pipe 17, pump 18 and pipe 19, or from the wash propane tank which will be hereafter described. The amount of diluent will depend upon the nature of the wax, the viscosity of the oil, the nature of the diluent, etc. and it may vary through relatively wide limits. In my preferred embodiment I mix one part of wax-bearing oil with four parts of propane and introduce this mixture through pipes 20 and 21 into chill chamber 22. It should be understood, of course, that suitable water coolers or heat exchangers may be interposed between the mixer 15 and the chill chamber 22, use being made of ordinary cooling water to bring the temperature of the propane-oil mixture down to about 70–80° F. The temperature in the mixer and the degree of mixing should be sufficient to obtain substantially complete solution of both wax and oil in the diluent. When the chiller has been filled to about two-thirds or three-fourths of its volume the valve in pipe 20 is closed, the valve in pipe 23 is opened and a cooling fluid is passed through pancake coils 23 in the upper part (vapor space) of the chill chamber by means of pump 23a. This cooling fluid may be brine or other heat carrier, or it may be a refrigerant like ammonia or propane expanded directly in coils 23. As these coils are cooled, diluent vapors are condenser, thus lowering the pressure in the chill chamber and causing the rapid evolution of more vapors. The condensed vapors may be allowed to drip directly back into the diluted oil mixture, or they may be recovered in a collector pan 24 and reinjected into the body of the liquid through pipes 25 and 26. The condensate is much colder than the oil-wax mixture, and by returning this cold condensate thereto I maintain a substantially constant oil-diluent ratio and at the same time I materially increase the rate of cooling. It may be desirable to reduce the amount of diluent in the system as the mixture is cooled, and in this case I may withdraw the condensed diluent through pipe 27 and return it to the storage tank by pump 28. If diluent is to be removed from the system, however, it will probably be desirable to remove it through pipe 29 and bypass 30 or pump 31 to pipe 32 and condenser 33. Still another way of abstracting propane is to pass it through pipe 34 and bypass 35 or pump 36 to the base of absorber 12, wherein the propane may be absorbed in the incoming wax-bearing oil.

A feature of all of the above cooling systems is the fact that during a part of the operation at least, the propane may be liquefied and returned for reuse without compression; in one case the propane is condensed by coils 23 in the chamber and returned in liquid form,—in another case it is passed around the compressor through bypass 30 directly to condenser 33, and in the third case it is bypassed in pipe 35 around compressor 36 and introduced directly into the base of the absorber tower 12. In any type of cooling, therefore, I am able to materially reduce compressor costs.

The rate of cooling will depend somewhat on the nature of the wax, oil and diluent, but in the present instance I prefer to cool at the rate of about 2° to 5° per minute until a temperature of about −40° F. is obtained. I then transfer the cold slurry of precipitated wax in the diluted oil through pipe 37, pump 38, surge chamber 39 and pipe 40 to the base of closed filter 41. The pump 38 is preferably of the sliding vane type so that there will be a minimum amount of agitation and breaking up of wax crystals, but reciprocating pumps may be used for this purpose if a suitable surge chamber is provided to maintain a uniform pressure in the filter chamber. For this purpose I have found that a vertical column 42, provided with a float member 43, and heater 44, may be utilized as a surge chamber. When handling propane, the surge chamber will have to be insulated and instead of using a heater coil 44, I may merely leave the top of the surge chamber uninsulated—the top wall of the surge chamber acting as a heater. The function of this heater is to maintain a portion of the diluent in the gaseous state in the upper part of the surge chamber so that it may form a cushion to absorb pressure variations due to the use of the reciprocating pump or to conditions in the filter. The column 42 is preferably a relatively long pipe so that the high temperature in the top thereof will not unduly heat the chilled slurry which is flowing through the bottom thereof. Float 43 insulates and isolates the warm vapors from the cold wax slurry. A surge chamber of this type is particularly useful when the liquid is being transferred at a temperature fairly close to its boiling point.

Filter 41 is preferably a closed cylindrical, vertical chamber having a plurality of leaves 42 suspended therein. The filtrate from the various leaves is withdrawn through pipe 43 and conducted to collector 44, thereby building up a cake on each filter leaf. When this cake is about a half inch thick the slurry may be forced from the filter back to the chiller by gas introduced through pipe 45, and the filter is then filled with fresh precooled propane through pipe 46. The first washing will be rich in oil, and it may therefore be transferred to the filtrate collector 44. Most of the wash propane, however, is transferred by pipe 47 to wash filtrate tank 48. This wash filtrate is preferably introduced by pump 49 and pipe 50 to mixer 15 wherein it is admixed with incoming wax-bearing oil in place of fresh propane from pipe 19. If desired, I may introduce the wash filtrate directly into the chill chamber through pipe 51. The temperature of the wash filtrate may be maintained at about −40° F. by removing vapors therefrom, the particular gas lines, compressors, etc., being omitted from the drawing to avoid confusion.

When the oil has been washed out of the wax filter cakes by propane, the excess of wash propane may be displaced by gas from pipe 45 to chiller 22, or to some other suitable receptacle, and the wax cake may be blown from or shaken off of the filter leaves by the pulsation of gas currents through pipe 52. It may be necessary to supplement the blow back with jets of gas or propane directed against the filter leaves to insure the complete removal of the filter cake, which falls as a slurry to the base of the tank and is withdrawn through pipe 53 to wax collector 54.

The waxy mixture in this collector is melted by a heating fluid in coils 55. The coils 55 may be connected with coils 23 so that brine or other liquid transfers the heat from chill chamber 22 to melt the wax in collector 54 and utilizes the refrigeration of the wax slurry to cool the oil-wax mixture in the chiller. By means of a similar device I may bring about a heat exchange relationship between the chiller and the filtrate collector, or between the chiller or any other source of refrigeration.

The melted wax slurry is passed through pipe 56 to exchanger 57 and boiler 58 wherein heater 59 boils out the propane. The propane is returned by pipe 60 to suitable compressor and/or condenser and storage, and the resultant wax is transferred by pump 61 through heat exchanger 57 and pipe 62 to a storage tank.

Cold filtrate in collector 44 is forced by pump 63 through heat exchanger 64 to high pressure boiler 65, heated by steam coil 66, the propane passing by pipe 67 and condenser 68 back to the storage tank 16. The oil from the base of boiler 65 is passed through pipe 69, heat exchanger 70 and expansion valve 71 into stripper 72, which is heated by steam coil 73. The propane is returned through pipe 74, pump 75, and condenser 76 to storage tank 16, and the finished oil is withdrawn through pipe 7, heat exchanger 70 and pipe 78 to storage. I may also pass cold filtrate through line 63a to pump 23a and coil 23, where its refrigerating effect is utilized in chilling oil and propane; it may then be passed to boiler 65 by line 63b.

It should be noted that the propane which is to be used for washing the filter cake must be precooled, and I accomplish this precooling by passing fresh propane through pipe 79, pump 80 and pipe 81 through heat exchanger 64 wherein the propane is cooled to the temperature of the filtrate leaving collector 44. The cold propane leaving heat exchanger 64 may be introduced by pipe 46 into the base of the filter or it may be introduced by pipe 82 directly into the chill chamber. Heat exchanger 64 is diagrammatically illustrated as a long, outer pipe surrounding an inner pipe, filtrate passing through the outer pipe and the fresh propane passing countercurrently thereto through the inner pipe. It should be understood, of course, that any other suitable type of heat exchanger may be employed. Both the propane and the filter are wax-free, so that there is no difficulty due to wax adhering to walls.

An important feature of my invention is the method of cooling the mixture in the chill chamber by self refrigeration induced by the condensation of propane vapors in the upper part of the chamber. By this scheme I am able to utilize the refrigerating value of various fluids for precooling the oil-wax mixture without causing the wax to adhere to a metal surface. Thermal efficiency is also obtained by bypasses 30 and 35, which makes it possible to allow a portion of the propane to evaporate from the mixture and condense in a water-cooled condenser under the pressure of the system without the use of the compressor; the temperature obtainable in the oil-propane solution will probably be about 20° higher than the temperature of the cooling water, but nevertheless a considerable economy may be effected in compressor costs.

While I have disclosed in detail a preferred embodiment of my invention it should be understood that I do not limit myself to any of the details hereinabove set forth except as defined by the following claims which should be construed as broadly as the prior art will permit.

I claim:

1. The method of cooling a mixture of waxy oil diluted with a normally gaseous diluent in a closed chill chamber, which comprises condensing vapors above said mixture in said chamber whereby the pressure in the chiller is lowered and vaporization of the diluent is increased, and returning the cold condensed diluent to the body of diluted oil-wax mixture.

2. The method of claim 1 wherein the cold condensed diluent is injected into the body of diluted oil-wax mixture below its liquid level so that the returning of the cold condensed diluent effects agitation of the oil-wax mixture.

3. The method of claim 1 wherein the cooling is supplemented by the withdrawal of vapors from the chill chamber.

4. The method of transferring wax slurry admixed with a liquefied normally gaseous diluent from a chill chamber to a filter which comprises forcing said slurry through a mechanical pump and stabilizing the pressure on the discharge side of said pump by means of a surge chamber.

5. The method of maintaining uniform pressure in a system wherein liquid material is being transferred at a temperature near its boiling point which comprises passing said liquid through a surge chamber provided with a vapor space and heating the vapor in said space to a temperature sufficient to prevent its condensation; whereby it will be present in the surge chamber in the gaseous phase.

6. The method of separating wax from a wax-bearing oil which comprises diluting said oil with a normally gaseous refrigerant, introducing said diluted mixture into a chilling zone, chilling said mixture by vaporization of diluent therefrom, whereby wax is solidified, separating the solidified wax from the diluted oil and using the refrigeration effect of the separated products for condensing diluent vapors in the chilling zone.

7. In apparatus of the class described, means for diluting a wax-bearing oil with a liquefied normally gaseous refrigerant, a chill chamber, means for introducing said diluted mixture into said chill chamber, means for chilling said mixture by vaporization of diluent therefrom whereby the wax is solidified, means for mechanically separating the solidified wax from the diluted oil, and means for using the refrigeration effect of the separated products for condensing diluent vapors in the chill chamber.

8. In apparatus of the class described, a surge chamber, means for introducing a liquid into and withdrawing liquid from said surge chamber, means for heating said surge chamber at a point removed from said inlet and outlet means, and a seal for floating upon the surface of the liquid in the chamber and insulating said liquid from said heating means.

9. The method of separating wax from a wax-bearing oil which comprises diluting said oil with a normally gaseous diluent, introducing said diluent mixture into a chilling zone, introducing a refrigerant at the top of said chilling zone but out of contact with said mixture, condensing vaporized diluent by means of said refrigerant in the upper part of the chilling zone, returning condensed diluent to the chilled mixture, cooling the mixture by this self-refrigeration process to a temperature at which substantially all the wax is solidified, mechanically separating said wax from the diluted oil, and removing the diluent from the dewaxed oil.

10. The method of separating wax from a wax-bearing oil in a system containing a closed chill chamber which comprises diluting said oil with a normally gaseous diluent, introducing said diluted oil into the lower part of said closed chill chamber so that the upper part of the chamber will contain diluent vapors, condensing diluent vapors in said chamber by heat exchange above the surface of the liquid with a cooling fluid whereby the pressure in the vapor space will be lowered and vaporization of diluent from the diluted oil will be augmented, thereby cooling the diluted oil to dewaxing temperature, mechanically separating solidified wax from diluted oil, and removing diluent from the separated diluted oil.

11. The process of claim 10 wherein the diluent consists chiefly of propane.

12. The method of claim 10 wherein the heat exchange is effected by a liquid which has been cooled by indirect contact with a material from the wax separation step.

13. The method of claim 10 wherein refrigeration by the cooling fluid is supplemented by the withdrawal of diluent vapors from the chiller.

ROBERT E. WILSON.